United States Patent [19]

Lazauski

[11] Patent Number: 5,696,738

[45] Date of Patent: Dec. 9, 1997

[54] UNDERWATER SENSING DEVICE FOR OCEAN FLOOR CONTACT

[75] Inventor: Colin J. Lazauski, West Kingston, R.I.

[73] Assignee: The United States of America as represented by the Secretary of the Navy, Washington, D.C.

[21] Appl. No.: 649,860

[22] Filed: May 10, 1996

[51] Int. Cl.$^6$ .................................................. G01V 1/38
[52] U.S. Cl. ............................ 367/188; 367/173; 181/122
[58] Field of Search ................................. 367/188, 173; 181/122, 401, 402

[56]  References Cited

U.S. PATENT DOCUMENTS

| | | | |
|---|---|---|---|
| 4,007,436 | 2/1977 | McMahon | 367/173 |
| 4,138,658 | 2/1979 | Avedik et al. | 181/122 |
| 4,733,378 | 3/1988 | Pearce et al. | 367/188 |
| 4,780,863 | 10/1988 | Schoepf | 367/188 |
| 5,022,012 | 6/1991 | Godfrey et al. | 367/173 |
| 5,189,642 | 2/1993 | Donoho et al. | 181/122 |
| 5,231,252 | 7/1993 | Sansone | 181/122 |
| 5,426,619 | 6/1995 | Madden et al. | 367/173 |
| 5,434,828 | 7/1995 | Logan | 367/188 |

Primary Examiner—Ian J. Lobo
Attorney, Agent, or Firm—Michael J. McGowan; William F. Eipert; Prithvi C. Lall

[57] ABSTRACT

An underwater sensing device for measuring or sensing an underwater condition proximate the floor of an ocean, lake or similar body of water. The sensing device includes an underwater sensing device mounting member and an underwater sensing device sensor, such as a hydrophone, mounted on the mounting member. The mounting member has known acoustic properties including a thickness and a largest dimension, each of which is a function of an acoustic wavelength in the underwater environment. The sensing device can also include acoustic diffraction reducing members disposed around the edges of the mounting member. The sensing device can also include first and second underwater sensors disposed on either side of the mounting member so that one of the sensors faces away from the underwater floor. An underwater sensing device switch, such as a gravity switch, activates the sensor that faces away from the underwater floor.

18 Claims, 2 Drawing Sheets

UNDERWATER SENSING DEVICE FOR OCEAN FLOOR CONTACT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to underwater sensing devices and in particular, to an underwater sensing device having a hydrophone for use in contact with an underwater floor.

2. Description of the Prior Art

Exploration and navigation of marine environments often requires measuring or monitoring conditions underwater, such as noise or acoustic waves. Underwater sensing devices, such as hydrophones, are used to measure or monitor underwater conditions by positioning the devices on or proximate an underwater floor of the ocean or other similar body of water. Some examples of underwater sensing devices are disclosed in U.S. Pat. No. 4,007,436 to McMahon, U.S. Pat. No. 4,733,378 to Pearce, et al., U.S. Pat No. 5,231,252 to Sansone, U.S. Pat. No. 5,022,012 to Godfrey, et al., U.S. Pat. No. 3,458,853 and 27,750 to Daniels, et al., U.S. Pat. No. 4,323,988 to Will, et al., U.S. Pat. No. 3,160,847 to Beck, et al., U.S. Pat. No. 4,975,799 to McGee, et al., U.S. Pat. No. 4,462,094 to Bowden, et al., and U.S. Pat. No. 4,571,711 to Chadwick.

Many problems have occurred, however, with the use and performance of the prior art underwater sensing devices. Some prior art underwater sensing devices include a stand that anchors or positions the underwater sensing device, such as a hydrophone, a certain distance from the underwater floor. These underwater sensing devices having a stand or support mechanism are difficult to properly install on the underwater floor. Underwater currents or other conditions in the underwater environment for example make it difficult for the underwater sensing device having a stand to be positioned in the desired upright position. An underwater sensing device such as a hydrophone that fails to be positioned with the proper orientation on the underwater floor is likely to malfunction and provide degraded or inaccurate readings.

Even if properly installed, the prior art underwater sensing devices positioned on or proximate an underwater floor are likely to have distorted and degraded output signals caused by the underwater floor. The accuracy of prior art underwater sensing devices that are positioned a distance from the underwater floor is significantly affected by acoustic reflections off the underwater floor that degrade the output signal of the underwater sensing device. Although acoustic reflections are somewhat reduced by positioning the underwater sensing device directly on the underwater floor, the composition of the floor will adversely affect the performance of the underwater sensing device positioned directly on the underwater floor.

The performance of prior art underwater sensing devices is therefore unpredictable and unstable as a result of reflections off the floor and the unknown composition of the floor. The performance of prior art underwater sensing devices is further degraded by the improper installation or orientation of the underwater sensing devices with respect to the underwater floor.

SUMMARY OF THE INVENTION

Accordingly, it is one object of the present invention to provide an underwater sensing device for underwater floor contact that is easy to install and properly orient with respect to the underwater floor. The underwater sensing device should also provide a predictable and stable performance regardless of underwater floor reflections and the composition of the underwater floor. The underwater sensing device should also be a simple and relatively inexpensive device.

The present invention features an underwater sensing device, for sensing at least one underwater condition in an underwater environment. The underwater sensing device includes at least one underwater sensing device mounting member, such as a plate, having at least a first mounting surface and at least one underwater sensing device sensor disposed or mounted on the first mounting surface of the underwater sensing device mounting member. The underwater sensing device sensor is adapted to sense at least one underwater condition, such as underwater acoustic frequencies.

The underwater sensing device mounting member or plate has known predetermined acoustic properties and includes a predetermined thickness and a predetermined largest dimension. The predetermined largest dimension of the underwater sensing device mounting plate is at least three times the underwater wavelength of the lowest acoustic frequency to be sensed by the underwater sensing device sensor. In one embodiment, the underwater sensing device mounting plate has a circular shape and the predetermined largest dimension is the diameter.

The predetermined thickness of the underwater sensing device mounting plate is preferably at least 1/8th the wavelength, in water, of the lowest frequency to be sensed. The underwater sensing device mounting plate having the above predetermined thickness and predetermined largest diameter thus provides an underwater sensing device mounting member of known acoustic properties that allows the underwater sensing device sensor to perform in a predictable and stable manner.

In a preferred embodiment, the underwater sensing device mounting member further includes a plurality of acoustic diffraction reducing members disposed on at least one edge of the underwater sensing device mounting member. The acoustic diffraction reducing members reduce acoustic diffraction along the edge of the underwater sensing device mounting member. In one example, the acoustic diffraction reducing members include randomly-sized petals disposed around the edges of the entire underwater sensing device mounting member or plate.

In the preferred embodiment, the underwater sensing device further includes at least first and second underwater sensing device sensors. The first underwater sensing device sensor is disposed on the first mounting surface of the underwater sensing device mounting member or plate, and the second underwater sensing device sensor is disposed on a second mounting surface of the underwater sensing device mounting member or plate. Having first and second underwater sensing device sensors on opposite first and second mounting surfaces of the underwater sensing device mounting member or plate allows one of the underwater sensing device sensors to be facing a direction away from the underwater floor when the underwater sensing device is positioned or installed on the underwater floor. Thus, the underwater sensing device according to the present invention is easily installed with either side of the underwater sensing device positioned against the underwater floor.

The underwater sensing device having first and second underwater sensing device sensors further includes an underwater sensing device switch coupled to the first and second underwater sensing device sensors, for activating one of the first and second underwater sensing device sensors. In one embodiment, the underwater sensing device switch includes a gravity switch that activates the underwater sensing device sensor that faces in a direction away from the underwater floor.

In one embodiment, the underwater sensing device mounting member includes first and second underwater sensing device mounting plates coupled together. The first underwater sensing device sensor is disposed on a mounting surface of the first underwater sensing device mounting plate and the second underwater sensing device sensor is disposed on a mounting surface of the second underwater sensing device mounting plate. The first and second underwater sensing device mounting plates preferably include at least one vibration damping layer disposed between the first and second underwater sensing device mounting plates.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
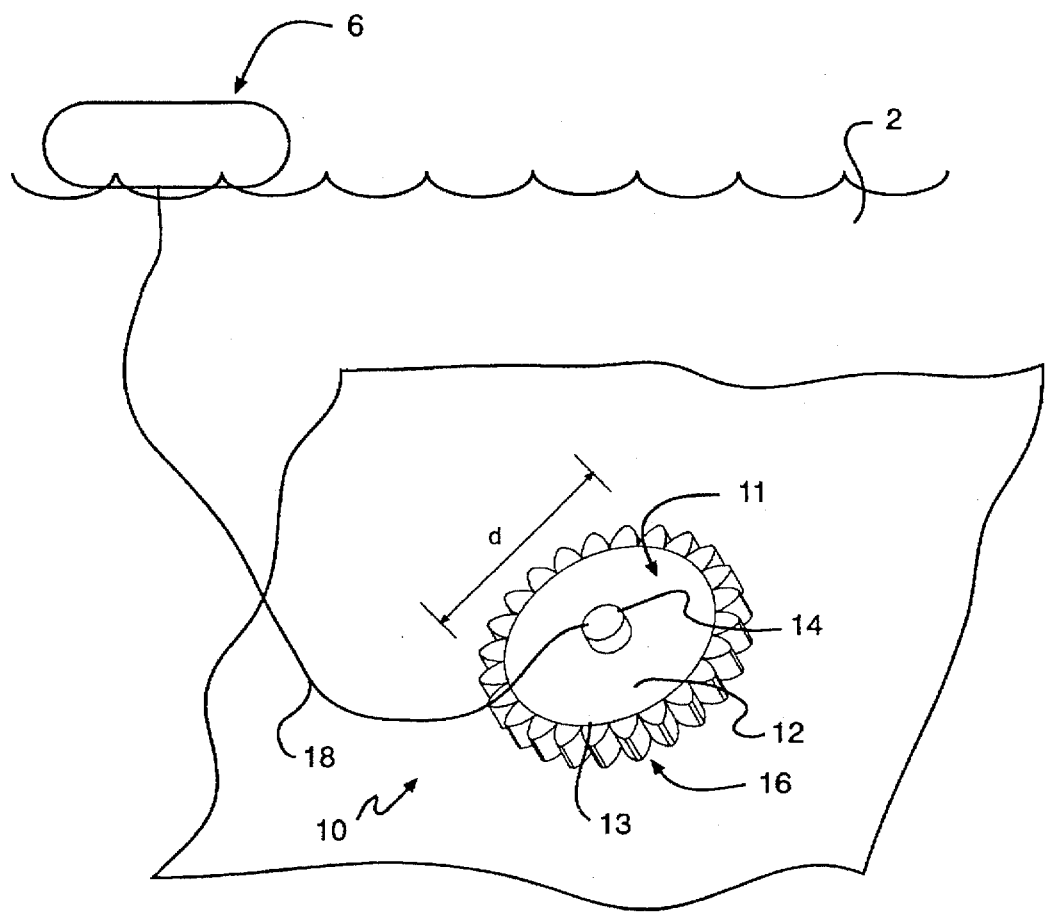
FIG. 1 is a perspective view of an underwater sensing device according to the present invention disposed on an underwater floor.

An underwater sensing device 10, FIG. 1, according to the present invention, is used to sense an underwater condition, such as acoustic noise proximate an underwater floor 4 in a body of water 2, such as an ocean, sea, lake, or similar bodies of water. The underwater sensing device 10 includes an underwater sensing device mounting member 12, such as a plate, and one or more underwater sensing device sensors 14, such as a hydrophone, disposed or mounted on a mounting surface 11 of the underwater sensing device mounting member 12.

A signal lead 18 coupled to the underwater sensing device sensor 14 electrically or optically connects the underwater sensing device sensor 14 to a data collection system 6. The underwater sensing device sensor 14, such as a hydrophone, senses the underwater condition, e.g., acoustic frequencies, and transmits a signal corresponding to the underwater condition through the signal lead 18 to the data collection system 6.

The underwater sensing device mounting member 12 provides a mounting surface of known acoustic properties on which the underwater sensing device sensor 14 can more accurately and precisely sense an underwater acoustic condition. The underwater sensing device mounting member 12 is made of a material of known acoustical properties and preferably of an acoustically hard material, such as mild steel or stainless steel. The acoustically hard material preferably has a mass density at least 7.5 times greater than water, an acoustic impedance at least 25 times greater than water, and a reflected wave phase shift of less than or equal to 17 degrees.

The underwater sensing device mounting member 12 has a predetermined thickness t and a predetermined largest dimension d that provide one or more desired known acoustic properties. In the preferred embodiment, the predetermined largest dimension of the underwater sensing device mounting member 12 is at least three times the wavelength in water of the lowest acoustic frequency to be sensed by the underwater sensing device sensor 14. In the preferred embodiment, the thickness of the underwater sensing device mounting member 12 is at least one-eighth (⅛) the wavelength in water of the lowest acoustic frequency to be sensed by the underwater sensing device sensor 14.

In one example for an underwater sensor designed to measure a lowest frequency of 10 kHz, the predetermined largest dimension of an underwater sensing device mounting member 12 made of mild steel is approximately 0.45 meters and the predetermined thickness is approximately 2.0 centimeters.

The underwater sensing device sensor 14 is preferably mounted at or near the center of the underwater sensing device mounting member 12. In one embodiment, the underwater sensing device mounting member 12 has a circular shape and the predetermined largest dimension is the diameter of the circle. The present invention, however, contemplates other polygonal shapes having any number of sides. Thus, the underwater sensing device mounting member 12 assures stable and predictable readings by the underwater sensing device sensor 14 regardless of the reflections off and unknown composition of the underwater floor.

In the preferred embodiment, the underwater sensing device 10 further includes acoustic diffraction reducing members 16 disposed on at least one edge 13 of the underwater sensing device mounting member 12. The acoustic diffraction reducing members 16 reduce diffraction of acoustic waves at the edges 13 of the underwater sensing device mounting member 12 to further provide a more predictable and stabilized performance of the underwater sensing device sensor 14.

In one example, the acoustic diffraction reducing members 16 include randomly-sized petal-shaped members disposed around the edges 13 of the entire underwater sensing device mounting member 12. The sizes of the randomly sized petal-shaped members range from approximately 1/16th to 1 wavelength in width and approximately 1/16 to 1 wavelength in length of the lowest sensed frequency. The possible shapes of the diffraction reducing members 16 include, but are not limited to, rectangular, triangular or semicircular shape. The petal-shaped members can be flat in the plane of the mounting device member or curved or angled up from this plane no more than ½ wavelength of the lowest frequency in water.

Figure 2:
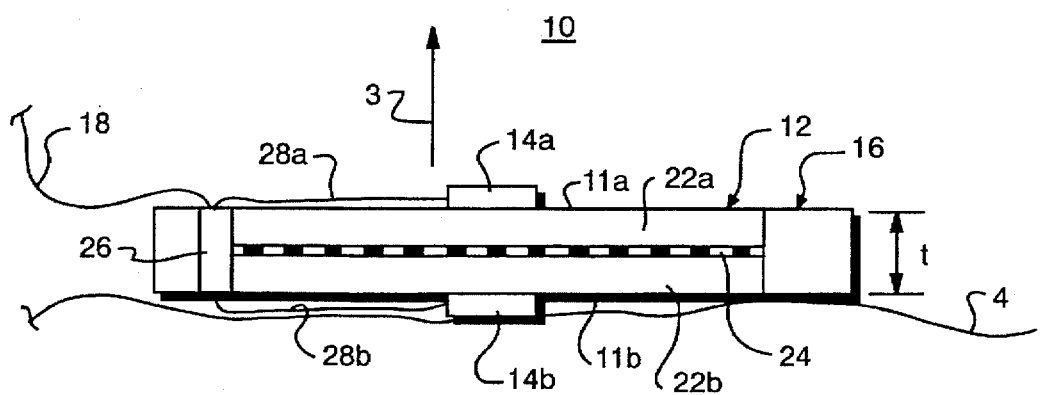
FIG. 2 is a side cross-sectional view of the underwater sensing device according to one embodiment of the present invention.

In one embodiment, the underwater sensing device 10, FIG. 2, includes two underwater sensing device sensors 14a, 14b, such as hydrophones. A first underwater sensing device sensor 14a is disposed or mounted on a first side or mounting surface 11a of the underwater sensing device mounting member 12, and a second underwater sensing device sensor 14b is mounted on a second surface side or mounting 11b of the underwater sensing device mounting member 12.

In this embodiment, one of the first and second underwater sensing device sensors 14a, 14b will be facing in a direction 3 away from the underwater floor 4. Thus, either surface 11a, 11b of the underwater sensing device mounting member 12 can be positioned against the underwater floor 4 without affecting the performance of the underwater sensing device 10.

The underwater sensing device 10 having two underwater sensing device sensors 14a, 14b preferably includes an underwater sensing device switch 26 coupling each of the first and second underwater sensing device sensors 14a, 14b to the signal lead or cable 18 byway of respective first and second signal lead lines or cables 28a, 28b. The underwater sensing device switch 26 activates the one underwater sensing device sensor 14a that faces in the direction 3 away from the underwater floor 4. The preferred underwater sensing device switch 26 includes a gravity switch that is activated by the force of gravity to connect the underwater sensing device sensor 14a facing in the direction 3 away from the underwater floor 4 and to disconnect the underwater sensing device sensor 14b facing the underwater floor 4.

In one embodiment, the underwater sensing device mounting member 12 includes at least first and second underwater sensing device mounting plates 22a, 22b coupled together. The first underwater sensing device mounting plate 22a includes the first mounting surface 11a and the first underwater sensing device sensor 14a disposed or mounted substantially in a central location thereon. The second underwater sensing device mounting plate 22b includes the second mounting surface 11b and the second underwater sensing device sensor 14b disposed or mounted substantially in a central location thereon.

A vibration damping layer 24 is preferably disposed between the first and second underwater sensing device mounting plates 22a, 22b. The vibration damping layer 24 is secured to both the first and second underwater sensing device mounting plates 22a, 22b and is preferably made of a damping material, such as a damping adhesive epoxy or composite damping tile material.

In one example, a self adhesive damping epoxy is applied to the back of the mounting plates 22a, 22b and then the plates 22a, 22b are pressed together. Similarly, the damping epoxy can be applied to the back of a single mounting plate 22a if only one is used. An example of a commercial product of this type is EPOXY DAMP 358, manufactured by the SOUNDCOAT® corporation.

In another example, a composite material damping tile material is attached by adhesives to the back of both mounting plates, 22a, 22b or to a single plate. An example of a commercial product of this type is MIL—P-23653C DAMPING TILES manufactured by EAR Specialty Composites.

Figure 3:
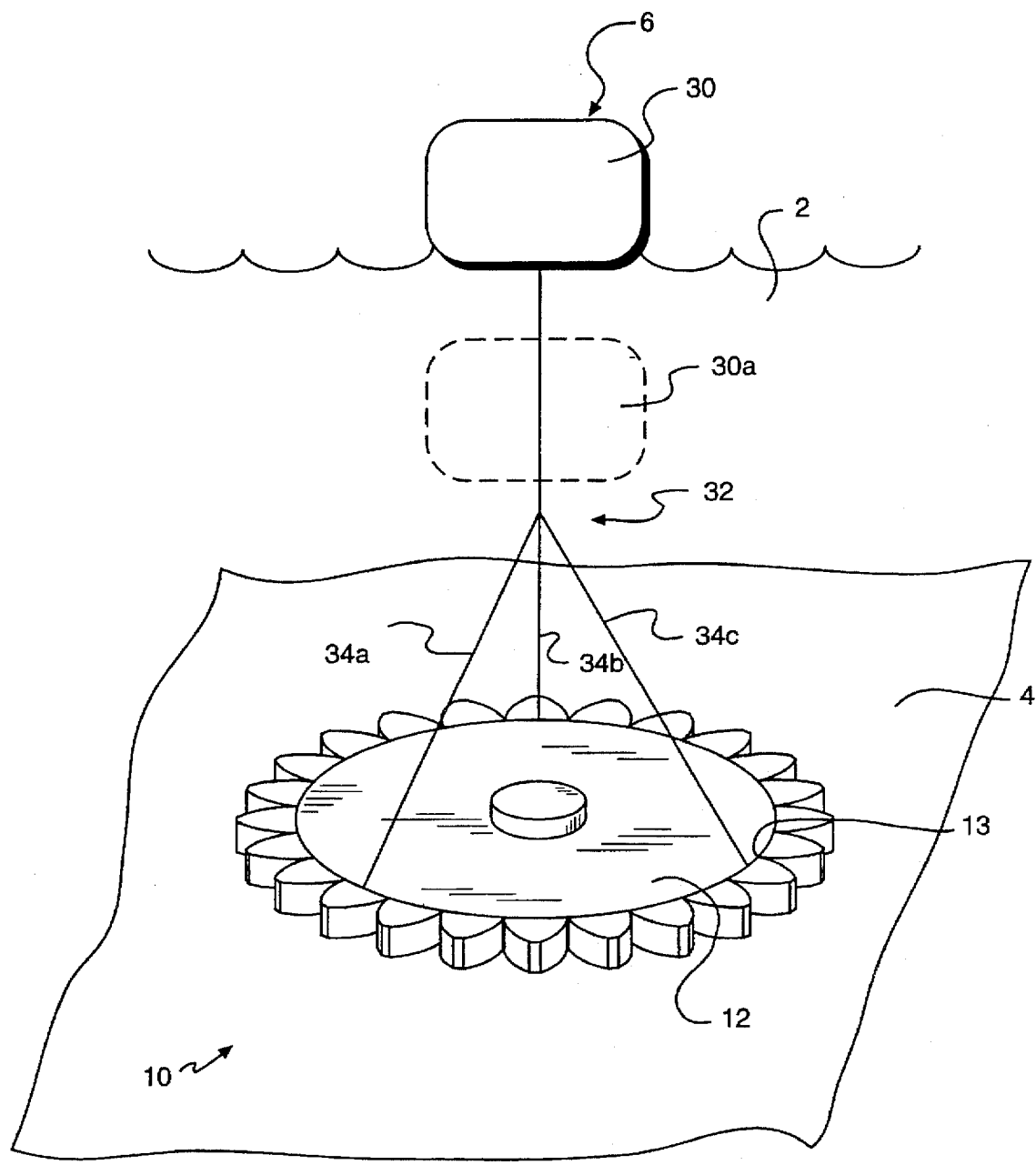
FIG. 3 is a perspective view of the underwater sensing device used to anchor a data collection system according to another embodiment of the present invention.

In an alternative embodiment, the underwater sensing device 10, FIG. 3, also serves as an anchor for the data collection system 6. The data collection system 6 is located in a housing 30, such as a buoy, that is floating on the surface of the water 2 or a housing 30a that is submerged in the water 2. Anchoring members 32, such as cables, extend from the housing 30, 30a, to the underwater sensing device 10. In the preferred embodiment, at least three cables 34a, 34b, 34c are coupled around the underwater sensing device mounting member 12 proximate the edge 13 to provide a stable anchor for the housing 30, 30a. Accordingly, the present invention provides an underwater sensing device that can be easily installed or oriented on an underwater floor. The underwater sensing device also has desirable known acoustic properties that allow the device to in light of the above, it is therefore understood that perform in a predictable and stable manner regardless of acoustic reflections off of the underwater floor or other unknown characteristics of the underwater floor.

In light of the above, it is therefore understood that within the scope of the appended claims, the invention may be practiced otherwise than as specifically described.

What is claimed is:

1. An underwater sensing device comprising:
   an underwater sensing device mounting member having a mounting surface and a plurality of acoustic diffraction reducing members disposed proximate to at least one edge of said underwater sensing device mounting member, for reducing acoustic diffraction along said at least one edge of said underwater sensing device mounting member, said underwater sensing device mounting member further having a predetermined thickness and a predetermined largest dimension; and
   at least one underwater sensing device sensor mounted on said mounting surface of said underwater sensing device mounting member, said at least one underwater sensing device sensor for sensing at least one underwater condition.

2. The underwater sensing device of claim 1 wherein said plurality of acoustic diffraction reducing members include randomly-sized petal shaped members.

3. The underwater sensing device of claim 1 wherein said plurality of acoustic diffraction members are disposed on edges around the entire underwater sensing device mounting member.

4. An underwater sensing device comprising:
   an underwater sensing device mounting member having a first mounting surface and a second mounting surface opposite said first mounting surface, said underwater sensing device mounting member having a predetermined thickness and a predetermined largest dimension; and
   a first underwater sensing device sensor mounted on said first mounting surface of said underwater sensing device mounting member and a second underwater sensing device sensor disposed on said second mounting surface of said underwater sensing device mounting member, each of said first and second underwater sensing device sensors sensing at least one underwater condition.

5. The underwater sensing device of claim 4 wherein said underwater sensing device mounting member includes an underwater sensing device mounting plate.

6. The underwater sensing device of claim 4 wherein one of said first and second underwater sensing device sensors is adapted to sense at least one acoustic frequency, and wherein said predetermined largest dimension of said underwater sensing device mounting member is at least three times an underwater wavelength of a lowest frequency of said at least one acoustic frequency to be sensed by said at least one underwater sensing device sensor.

7. The underwater sensing device of claim 4 wherein said underwater sensing device mounting member has a circular shape and said predetermined largest dimension is the diameter of said circular shaped underwater sensing device mounting member.

8. The underwater sensing device of claim 4 wherein one of said first and second underwater sensing device sensors is adapted to sense at least one acoustic frequency, and wherein said predetermined thickness of said underwater sensing device mounting member is at least $\frac{1}{8}$th a wavelength in water of a lowest frequency of said at least one acoustic frequency.

9. The underwater sensing device of claim 4 further including an underwater sensing device activation switch coupled to said first and second underwater sensing device sensors, for activating one of said first and second underwater sensing device sensors.

10. The underwater sensing device of claim 9 wherein said underwater sensing device activation switch includes a gravity switch, for activating said one of said first and second underwater sensing device sensors that faces a direction away from the underwater floor when said underwater sensing device is positioned on the underwater floor.

11. The underwater sensing device of claim 4 further including at least one signal lead coupled to one of said first and second underwater sensing device sensors, for electrically connecting said underwater sensing device sensor to a data collection system.

12. The underwater sensing device of claim 4 further including a mooring cable coupled to said underwater sensing device mounting member, for anchoring a data collection system with said underwater sensing device.

13. The underwater sensing device of claim 4 wherein one of said first and second underwater sensing device sensors includes a hydrophone mounted proximate said mounting surface of said underwater sensing device mounting member.

14. An underwater sensing device comprising:

an underwater sensing device mounting member having a mounting surface, said underwater sensing device mounting member having predetermined thickness and a predetermined largest dimension; and at least one underwater sensing device sensor mounted on said mounting surface of said underwater sensing device mounting member, said at least one underwater sensing device sensor for sensing at least one underwater condition;

wherein said underwater sensing device mounting member includes a first underwater sensing device mounting plate coupled to a second underwater sensing device mounting plate; and wherein said at least one underwater sensing device sensor includes a first underwater sensor disposed on a mounting surface of said first underwater sensing device mounting plate and a second underwater sensor disposed on a mounting surface of said second underwater sensing device mounting plate.

15. The underwater sensing device of claim 14 further including a vibration damping layer disposed between said first and second underwater sensing device mounting plates.

16. An underwater sensing device comprising:

an underwater sensing device mounting member having at least one mounting surface;

a plurality of acoustic diffraction reducing members, disposed on at least one edge of said underwater sensing device mounting member, for reducing diffraction of acoustic waves at said at least one edge of said underwater sensing device mounting member; and an underwater sensing device sensor, disposed proximate said at least one mounting surface, for receiving at least one acoustic frequency.

17. An underwater sensing device comprising:

an underwater sensing device mounting member having a first and second mounting surface, said underwater sensing device mounting member including first and second underwater sensing device mounting plates coupled together and a vibration damping layer disposed between said first and second underwater sensing device mounting plates coupled together;

first and second underwater sensors, said first underwater sensor disposed proximate said first mounting surface, said second underwater sensor disposed proximate said second mounting surface; and an underwater sensing device switch coupled to said first and second underwater sensors, for activating one of said first and second underwater sensors.

18. The underwater sensing device of claim 17 wherein said underwater sensing device switch includes a gravity switch, for activating said one of said first and second underwater sensors that faces a direction away from an underwater floor when said underwater sensing device is positioned on the underwater floor.

* * * * *